United States Patent
Bergey

(10) Patent No.: US 6,964,451 B1
(45) Date of Patent: Nov. 15, 2005

(54) SHOCK ABSORBING APPARATUS

(76) Inventor: Karl H. Bergey, 18781 Thunder Ridge, Norman, OK (US) 73072

(*) Notice: Subject to any disclaimer, the term of this patent is extended or adjusted under 35 U.S.C. 154(b) by 0 days.

(21) Appl. No.: 10/918,670

(22) Filed: Aug. 13, 2004

(51) Int. Cl.$^7$ .............................................. B60N 2/42
(52) U.S. Cl. ......................... 297/216.1; 297/216.13; 296/68.1; 296/187.03; 188/371
(58) Field of Search ................................ 297/216.1, 13, 297/15, 0.16, 452.13, 452.24, 452.52, 452.53, 297/452.56, 452.57, 471, 472; 296/68.1, 296/187.03; 188/371, 375, 376; 248/548, 248/636; 244/122 R

(56) References Cited

U.S. PATENT DOCUMENTS

| | | | |
|---|---|---|---|
| 3,264,034 A | | 8/1966 | Lawson |
| 3,563,498 A | * | 2/1971 | Haile ..................... 244/122 R |
| 3,749,205 A | * | 7/1973 | Fletcher et al. ............. 188/375 |
| 4,138,157 A | * | 2/1979 | Pickett et al. ............... 297/472 |
| 5,747,140 A | | 5/1998 | Heerklotz |
| 5,997,097 A | * | 12/1999 | Engelhard ................... 297/472 |
| 6,561,580 B1 | | 5/2003 | Bergey |

* cited by examiner

Primary Examiner—Peter M. Coumo
Assistant Examiner—Stephen D'Adamo
(74) Attorney, Agent, or Firm—James F. Harvey, III

(57) ABSTRACT

An energy-absorbing structure is provided, which comprises two generally parallel metal sheets arranged to receive an impacting force against the uppermost sheet and cooperatively prevent an object supported by the uppermost sheet from impacting a basal surface. One metal sheet may be fabricated from expanded metal for its non-isotropic shock-absorbing properties. The other metal sheet may be fabricated from a non-elastic material and arranged to be supported by pins inserted through holes along the perimeter of the sheet, so that when an impacting force is applied, it will resist the force until the force is sufficiently strong so as to shear the pins through the sheet and abruptly release, thus allowing the metal sheet fabricated from expanded metal to absorb the remainder of the impacting force. The invention may find application in vehicles operating in the air, land, or sea.

21 Claims, 5 Drawing Sheets

SHOCK ABSORBING APPARATUS

BACKGROUND OF THE INVENTION

The present invention relates generally to shock-absorbing structures, more particularly, to safety features incorporated into vehicle seats such as those found in aircraft, to protect the occupant, insofar as it is possible, from shock induced injury. Such structures may find utility in related fields such as automotive, machinery, or any vehicle having human occupants.

Vehicles are generally operated by human operators in a seated position within the vehicle. Such vehicles include land based vehicles such as automobiles, trucks, earth moving equipment, and the like; sea based vehicles such as boats and submarines; and flying vehicles such as aircraft, helicopters, and spacecraft. Because the vehicle is generally in motion, external forces may cause the compartment to abruptly change its direction of motion, resulting in forces exerted upon the occupant. These forces are made up of a horizontally oriented component and a vertically oriented component. The horizontal component may generally be handled by the use of seatbelts and padded structures.

The vertical force component may present characteristics that cannot be handled by seatbelts and padded structures. Given that the occupant is in a normal seated position, such vertical forces might be caused by a vertical fall ending in an abrupt stop. Seats have been fabricated with innovative cushions, springs, and hydraulic shock absorbers, all installed in the base of the seat, to dissipate such sudden and short duration vertical forces. Some of devices exhibit the tendency to return to the original configuration after dissipating the force, and other devices permanently deform to absorb the force and thus must be replaced afterwards.

Aircraft crash impacts in general, and helicopter crash impacts in particular, can produce decelerations in excess of 50 g. Without attenuation, these forces can result in serious injury or death to the occupants. Although a wide range of energy-absorbing seat designs are available, they have a number of deficiencies. First, such designs in general are mechanically complex. Second, their complexity tends to make such seating arrangements more expensive than normal seating arrangements. Third, mechanically complex designs tend to be heavy, which can be a serious disadvantage in aircraft where low weight is a desirable characteristic. Fourth, mechanically complex designs tend to be bulky, which can also be a serious disadvantage in aircraft where space is at a premium. Finally, designs that are mechanically complex, heavy, and bulky have been shown through to experience to have more expensive life cycle costs, in terms of repair, training, replacement parts, inventory, training for repair personnel, and so forth.

Most existing airborne vehicles are equipped with seating arrangements that cannot absorb sufficient impact energy or attenuate impact forces to prevent serious injury to the occupants. Incorporating better seating structures into new or in-service vehicles can degrade performance by increasing weight of the vehicle, where the weight penalty increases as the number of affected seats increases. Furthermore, replacing existing seating arrangements results in increased acquisition and maintenance costs. Any attempt to retrofit complex and bulky energy absorbing seats into existing airborne vehicles can be thus be both problematic and impractical.

The difficulty in retrofitting seat into existing aircraft exists throughout the complete spectrum of military and commercial helicopters and aircraft. Some commercial aircraft and helicopters must be certified according to the United Stated Consolidated Federal Regulations (CFR) 124, Parts 23, 25, 27, and 29, which requires impact testing of seats. This requirement was added long after most of the existing fleets had been produced. For the most part, these existing seats are therefore not compliant with the current requirements. To aggravate the problem, aircraft and helicopters certified to the earlier and less stringent regulations may continue to be produced under a "grandfather clause" without being required to meet these new regulations.

The inventor's U.S. Pat. No. 6,561,580, entitled "Energy Absorbing Seat", issued on May 13, 2003, provides such an inexpensive, lightweight seating apparatus and is incorporated herein by reference in its entirety. It provides a seating pan structure that is constructed of expanded metal and can be easily retrofitted into existing seating arrangements without extensive modification. The structure has sufficient elasticity to maintain its shape when subjected to moderate amounts of force. When subjected to a high level of vertical force, the seating pan structure deforms elasto-plastically to absorb a significant amount of the vertical force, so that injury to the lumbar area of the person occupying the seat is either eliminated or greatly reduced. However, over long periods of use, the structure can experience a series of small amounts of vertical force that can slightly exceed the elastic limit of the material and gradually deform it over time. The cumulative effect of successive slight deformations may result in periodic replacement of the seating pan structure.

As can be seen, there is a need for a seating apparatus for a person in a vehicle that is subject to vertical impact loads and where the seating apparatus is configured to attenuate such vertical forces without undue detrimental affect on the person occupying the seat. The seating apparatus should be simple in construction and therefore inexpensive. It should also be light and compact so that it is suitable for retrofit applications. Finally, the seating apparatus should be sufficiently resistant to the cumulative effect of non-catastrophic vertical loads so as to reduce the likelihood of deformation during normal use.

SUMMARY OF THE INVENTION

The present invention achieves its intended purposes, objects, and advantages through a new, useful, and unobvious combination of component elements, with the use of a minimum number of functioning parts, at a reasonable cost to manufacture, and by employing only readily available materials. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein. The invention described herein provides an apparatus that resists the cumulative effect of non- catastrophic vertical loads, while at the same time is simple in construction, light, compact, and suitable for retrofit into an existing vehicle. The invention provides a "structural fuse" that withstands normal operating loads without deformation up to a predetermined load above such normal operating loads. The structural fuse will fail at the predetermined load so that the excess energy or load can be absorbed by elasto-plastic deformation.

In one embodiment of the invention, an energy-absorbing structure is provided to absorb an impacting force, where the structure comprises a first metal sheet having an incident surface against which the impacting force is applied, the first metal sheet rigidly supported a distance from a basal surface by a rigid support means allowing the first metal sheet to elastically expand in the direction of the basal surface when the magnitude of the impacting force is less than a first threshold value and to return to its original conformation when the impacting force is removed, the rigid support means allowing the first metal sheet to plastically deform when the magnitude of the impacting force is greater than the first threshold value; and a second metal sheet positioned between the first metal sheet and the basal surface, the second metal sheet rigidly supported on a first edge and supported by a plurality of pins along an opposed second edge, each pin inserted through a hole positioned a spaced distance from the second edge, wherein each pin is configured to shear through an area of the second metal sheet between the pin and the second edge when the magnitude of the impacting force exceeds the a second threshold value and each pin rigidly supporting the second metal sheet when the impacting force is less than the second threshold value.

In another embodiment of the invention, an energy-absorbing structure is provided that is adapted for use in a seat attached a floor of a vehicle to support a torso of a seated person, the torso being subjected to a sudden load by an external force. The energy-absorbing structure is comprised of a first metal sheet and a second metal sheet, the first metal sheet supported by a first support means in spaced relation to the cabin floor so that energy absorption is maximized for a distance between the first metal sheet and the cabin floor, the second metal sheet having an incident surface arranged to support the torso, the second metal sheet positioned between the torso and the first metal sheet and supported by a plurality of pins attached to a second support means, each pin inserted through a hole positioned a spaced distance from a second metal sheet perimeter, wherein each pin shears through an area of the second metal sheet between the pin and the second metal sheet perimeter when the magnitude of the force exceeds the predetermined threshold value and each pin rigidly supports the second metal sheet when the force is less than the predetermined threshold value.

In another embodiment of the invention, an energy-absorbing seat is provided for use in an airborne vehicle, where the seat supports the torso of a seated person a distance from a solid portion of the airborne vehicle. The energy-absorbing seat comprises a rigid support means; a seat back attached to the support means and supporting the back of the person; and a seat pan attached to the support means, the seat pan supporting the torso of the seated person. The seat pan further comprises a first metal sheet and a second metal sheet, the first metal sheet being in spaced relationship to the solid portion, so that energy absorption is maximized for a distance between the first metal sheet and the solid portion; the second metal sheet with an incident surface arranged to support the torso, the second metal sheet positioned between the torso and the first metal sheet and supported by a plurality of pins attached to the support means, each pin inserted through a hole positioned a spaced distance from a second metal sheet perimeter, so that each pin shears through an area of the second metal sheet between the pin and the second metal sheet perimeter when the magnitude of the force exceeds the predetermined threshold value and each pin rigidly supports the second metal sheet when the force is less than the predetermined threshold value.

In another embodiment of the invention, an airborne vehicle with energy-absorbing seats is provided with at least one of the energy-absorbing seats comprising a rigid frame attached to a basal surface of the airborne vehicle; a seat back attached to the frame with the seat back supporting the back of a person occupying the seat; and a seat pan held in spaced relation to the basal surface with the seat pan supporting the torso of the person. The seat pan comprises an expanded metal sheet held in spaced relation to the basal surface by the frame so that energy absorption is maximized for a distance between the expanded metal sheet and the basal surface; and a solid metal sheet having an incident surface located against the torso, the solid metal sheet positioned between the torso and the expanded metal sheet, the solid metal sheet supported by a plurality of pins attached to the frame, each pin inserted through a hole with an area between the hole and a perimeter of the solid metal sheet. Each pin shears through its respective area when the magnitude of a force exerted on the incident surface exceeds a predetermined threshold value and each pin rigidly supports the solid metal sheet when the force is less than the predetermined threshold value.

In another embodiment of the invention, a method of absorbing energy is provided, the method comprising the following steps: providing an expanded metal sheet that is rigidly supported so as to permit the expanded metal sheet to either deform when a force is exerted upon its incident surface; supporting a solid metal sheet by a plurality of pins inserted through holes in the solid metal sheet that shear through the solid metal sheet whenever the magnitude of the force exceeds a threshold value; positioning the solid metal sheet to prevent the force from elastically deforming the expanded metal sheet when the force is less than the predetermined threshold value; and allowing the expanded metal sheet to plastically deform to absorb the force when the magnitude of the force exceeds the threshold value and causes the pins to shear through the solid metal sheet, whereby the solid metal sheet can no longer support the expanded metal sheet from elastic deformation.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
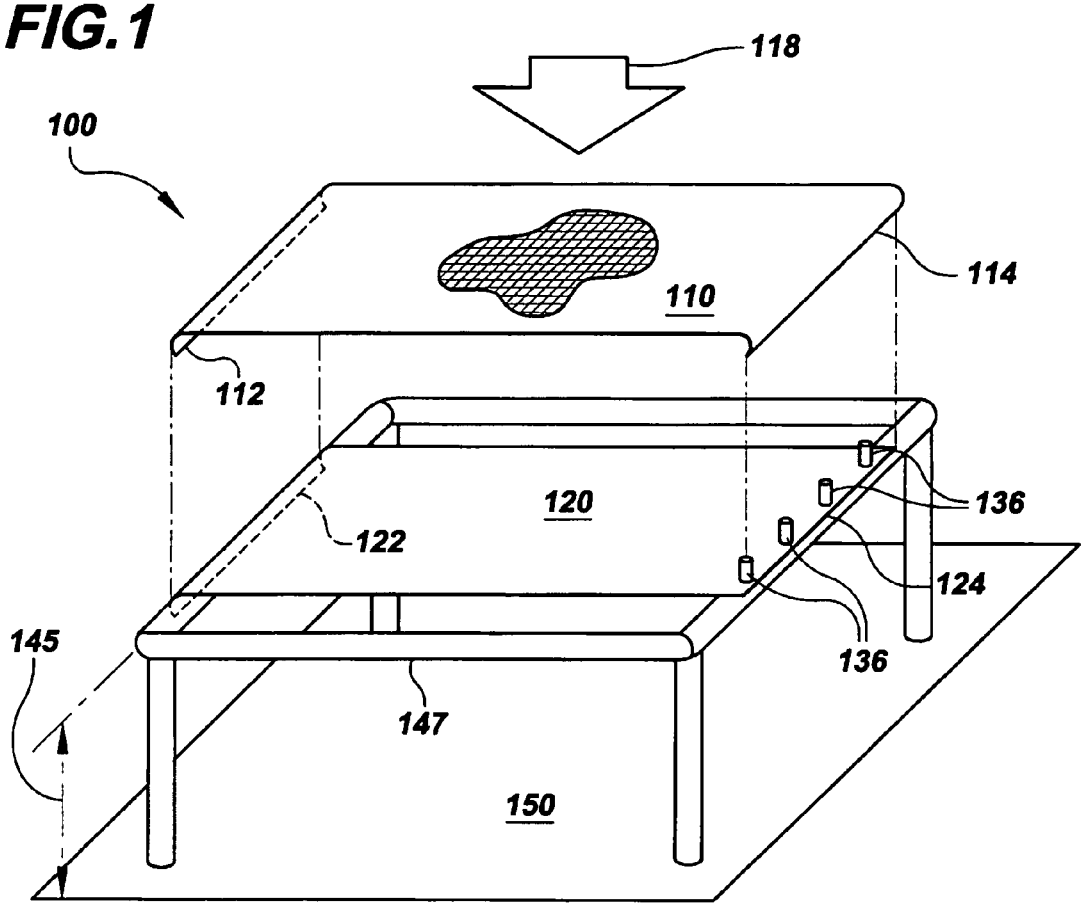
FIG. 1 shows an exploded isometric schematic illustrating the general principles upon which he structural fuse is based, according to an embodiment of the invention.

Referring now to FIG. 1, which shows an exploded view of an embodiment 100 of the invention, the general principles of the invention may be seen as implemented as a portion of a seating apparatus. The seating apparatus 100 is shown as a frame 147 supporting a first metal sheet 110 and a second metal sheet 120, with the first metal sheet 110 shown in an exploded view for clarity. Both metal sheets 110, 120 may be supported by the frame 147 a spaced distance 145 from a basal surface 150. The basal surface 150 may be considered to be any surface that might cause harm, injury, or damage to an object residing on the surface of the first metal sheet 110 if the impacting force were strong enough to cause that object to come into contact with the basal surface 150. For example, in one application, the frame 147 may be the frame of a seating arrangement and the basal surface 150 may be the cabin floor of an aircraft, with the metal sheets 110, 120 serving to support the seated torso of a person in the aircraft.

The first metal sheet 110 may be rigidly attached along two opposed edges 112, 114 to the frame 147 in such a manner that it will resist separation from the frame 147 when a force 118 is exerted upon it. The first metal sheet 110 may be rigidly supported along edges 112, 114 with any commonly used means known to the art, without departing from the scope of the invention. Such means may include, but not be limited to, welds, screws, bolts, rivets, pins, and adhesive bonding. The frame 147 may be any suitable means for supporting the first metal sheet 110 along its edges without obstructing the area between its edges. For example, a suitable support means might consist of a generally rectangular frame supporting a first metal sheet having a generally rectangular shape by two of its opposed edges 112, 114 being attached to horizontal structural members comprising the frame. The structural members may be of any form commonly found in the art that is suitable for structural support without departing from the scope of the invention. For example, the form of such structural members may include, but not be limited to, rods, beams, bars, surfaces (such as a vertical cabin wall of an aircraft), the horizontal main spars of small aircraft, and the like. Other suitable support means may be used without departing from the scope of the invention.

Figure 8:
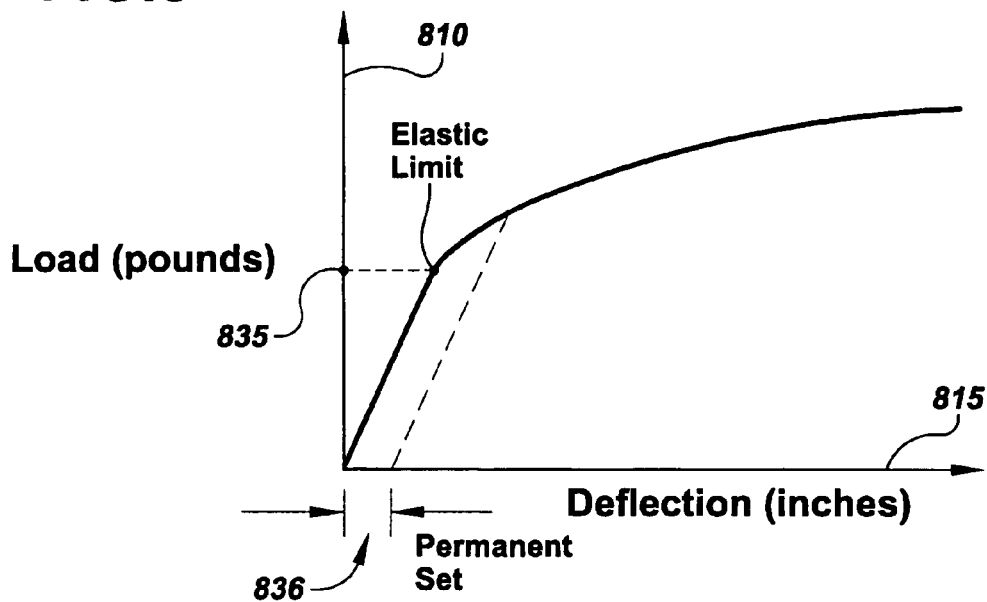
FIG. 8 shows a representative force-deflection graph illustrating the energy-absorbing properties of expanded metal.

The first metal sheet 110 may be fabricated of any material that deforms elasto-plastically when a force 118 is applied to its surface, so that it may absorb a significant portion of the energy thereof through the deformation mechanism. The energy-absorbing material should ideally have both elastic and plastic properties, as illustrated in FIG. 8. Here, the magnitude of a force, or load, applied to the material is given in pounds on the vertical axis 810 and the deflection of the material in inches as it is deflected by the load is given by the horizontal axis 815. Loads having magnitudes less than an inherent threshold value 835 of the material will result in an elastic deflection of the material; in other words, it will elastically return to its original position when the load is removed. This range of deflection for such loads is called the elastic range. However, for loads exceeding threshold value 835, the material will deflect plastically and permanently; in other words, it will deform and not return to its original state when the load is removed. This permanent deformation may allow the material to absorb a significant portion of the load as it deflects.

While a number of materials may have these characteristics, a material known to the art as expanded metal may be used as such an energy-absorbing material as discussed in U.S. Pat. No. 6,561,580, which is incorporated herein by reference in its entirety. Expanded metal is a commercially available commodity that is used for everyday applications such as barriers, stair treads, and filter support. It is formed by piercing and partially expanding sheet metal without the loss of material to form numerous spaces and connecting fibers that act as springs. The expanded metal sheet may be fabricated from any solid a metallic sheet having suitable qualities; a sheet fabricated from low carbon steel may be advantageously used in such an application, but other materials having the requisite characteristics may also be used as well. The first metal sheet 110 may be fabricated with a predetermined threshold value according to the principles described in U.S. Pat. No. 6,561,580, so that it will elastically deform when an impacting force 118 of magnitude less than its threshold value 835 is applied to its surface and still return to its original configuration and conformation; when the impacting force 118 has a magnitude greater than its threshold value 835, the first metal sheet 110 may permanently deform in a downward direction and thus absorb the impacting force 118.

A second metal sheet 120 may be positioned between the first metal sheet 110 and the basal surface 150 as shown in FIG. 1. Unlike the first metal sheet 110, the second metal sheet 120 may be constructed of a material that is fully elastic within the expected operational range of forces of the environment in which the seating apparatus 100 is used, so that the second metal sheet 120 may resist permanent deformation when an impacting force 118 within this expected operational range is applied to its surface. The second metal sheet 120 may be supported along opposed edges 122, 124 that generally correspond to the edges 112, 114 of the first metal sheet 110. According to the present embodiment, the second metal sheet 120 may be rigidly supported along one edge 122 in a manner similar to that of the first metal sheet 110.

Figure 2:
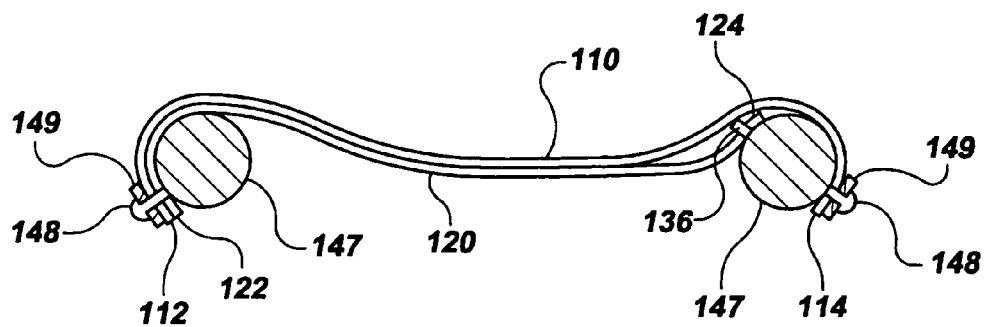
FIG. 2 shows a cross sectional view of the details of attaching the sheets to the frame, according to an embodiment of the invention.

FIG. 2 shows one example of how the edges 112, 122 may be rigidly attached to the frame 147. According to the figure, edges 112, 122 may be wrapped around a member of the frame 147 and secured by inserting a plurality of screws 148 through a bar 149 running the length of the frame member. The screws 148 may be tightened down upon the bar 148 so that the extent of edges 112, 122 may be compressed along their length against the frame member and held by the screws 148 and by friction. Although screws are shown, other means such as rivets, bolts, and the like may be used without departing from the scope of the invention. Edge 114 of the first metal sheet 110 may be secured to another frame member by similar means.

Figure 3:
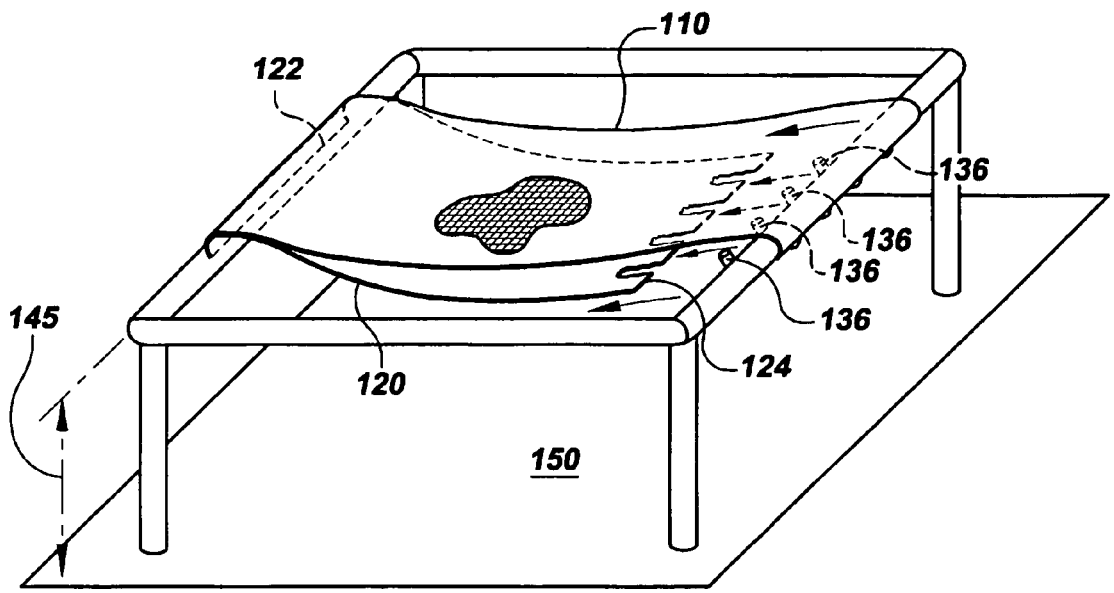
FIG. 3 shows a isometric schematic of a force being applied to an incident surface and the shearing action of the pins, according to an embodiment of the invention.
Figure 4:
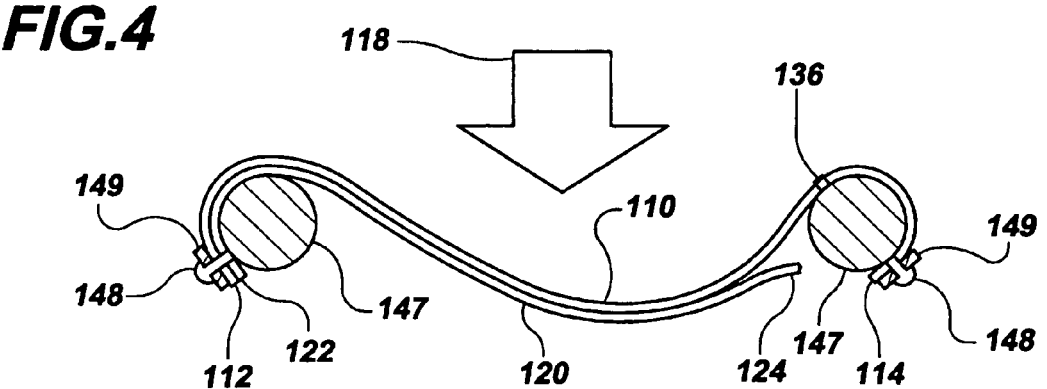
FIG. 4 shows a cross sectional view of the details of the attachment method after the shearing action has taken place, according to an embodiment of the invention.
Figure 5:
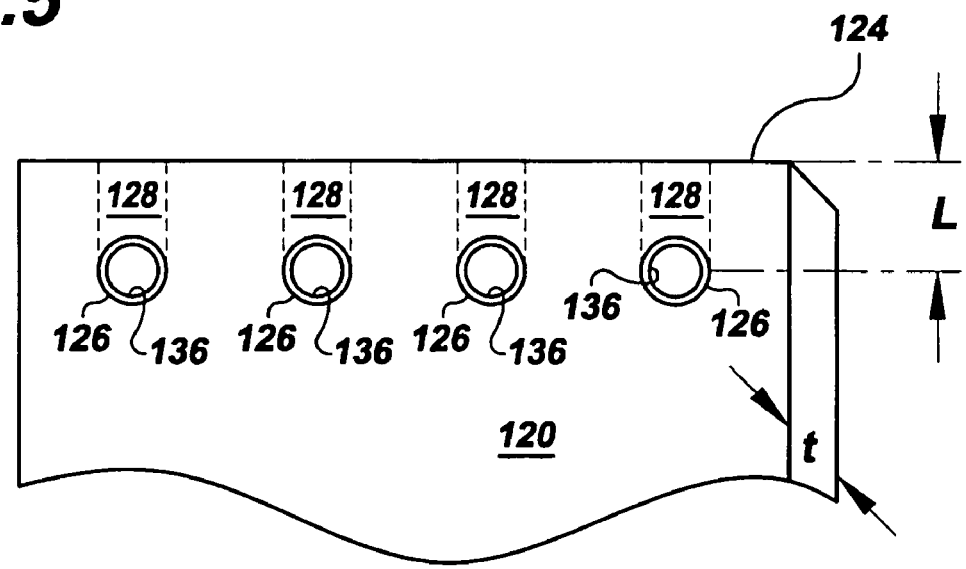
FIG. 5 shows a pin arrangement configured along a side of the structural fuse, according to an embodiment of the invention.
Figure 6:
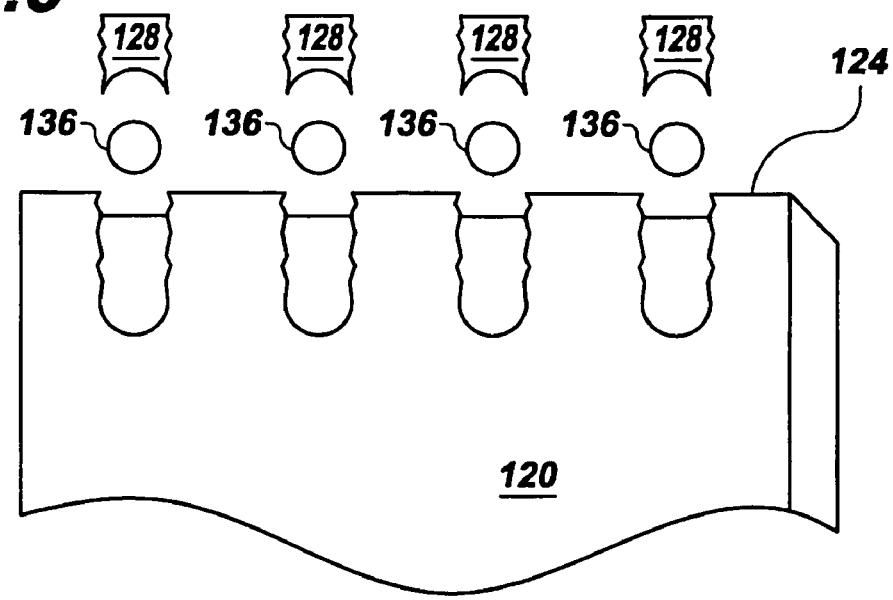
FIG. 6 shows a pin arrangement after the structural fuse has been used, according to an embodiment of the invention.

However, second sheet 120 may be supported along its opposed edge 124 by a means that will allow it to fail at a predetermined load, that may be outside the expected operational range of forces of the environment in which the seating apparatus 100 is used. As shown in FIGS. 2 and 4, edge 124 of the second metal sheet 120 may be separately secured by pins 136 inserted through holes 126 in the second metal sheet 120, so as to allow the pins 136 to shear through edge 124 when necessary. This support may be provided by a plurality of pins 136 inserted freely through holes 126 along edge 122, so that the second sheet 120 may fail through a shear action of the plurality of pins 136 pulling through the edge 124 of the second sheet 120. As best illustrated in FIGS. 3, 5, and 6, each pin 136 may be fabricated to rip, or shear, through a shear area 128 of the second metal sheet 120 between the hole 126 through which the pin 136 is inserted and the edge 124 of the second metal sheet 120. This shearing action may take place when the magnitude of the impacting force 118 exceeds a threshold value 935 (FIG. 9) associated with second metal sheet 120, where the threshold value would typically be outside the expected operational range. The second metal sheet 120 may be configured with a threshold value 935, so that an impacting force 118 having a magnitude in excess of the second threshold value will cause the pins 126 to shear through the shear areas 128 of the second metal sheet 120 and in turn cause the second metal sheet 120 to release from its supporting pins 126 without also releasing from its opposing edge 122. This release of the second metal sheet 120 may allow the first metal sheet 110 to elastically deform in the direction of the basal surface 150 and thus absorb either all or a significant portion of the impacting force 118. Although this embodiment may incorporate a shearing action as the means that allows second sheet 120 to fail when subjected to a predetermined load (i.e. at a threshold value), other such mechanical means may be used without departing from the scope of the invention.

As stated above according to FIG. 8, the first metal sheet 110 may be fabricated from expanded metal, which has energy-absorbing properties, that is, it elastically expand. In practice, however, it has been found that, when the expanded metal is fabricated of low carbon steel, the expanded metal material exhibits hysteresis under relatively low loading conditions. The expanded metal can thus take a permanent set 936 after a period of normal day-to-day operations. Such cumulative deformation could thus cause problems during the service life of the structural fuse. Tests have confirmed that some permanent set 936 could occur in normal use. It was found that, when small loads less than the threshold value 835 are applied to the expanded metal, it will deflect but will not always return to its exact original conformation. In other words, a small portion of permanent deflection, or permanent set 936, will remain. These small deflections are cumulative over time, so that the distance 145 may decrease. This diminishes the protective value of the first metal sheet 110, so that as it sags it must be periodically replaced in order to maintain its protective properties.

Figure 9:
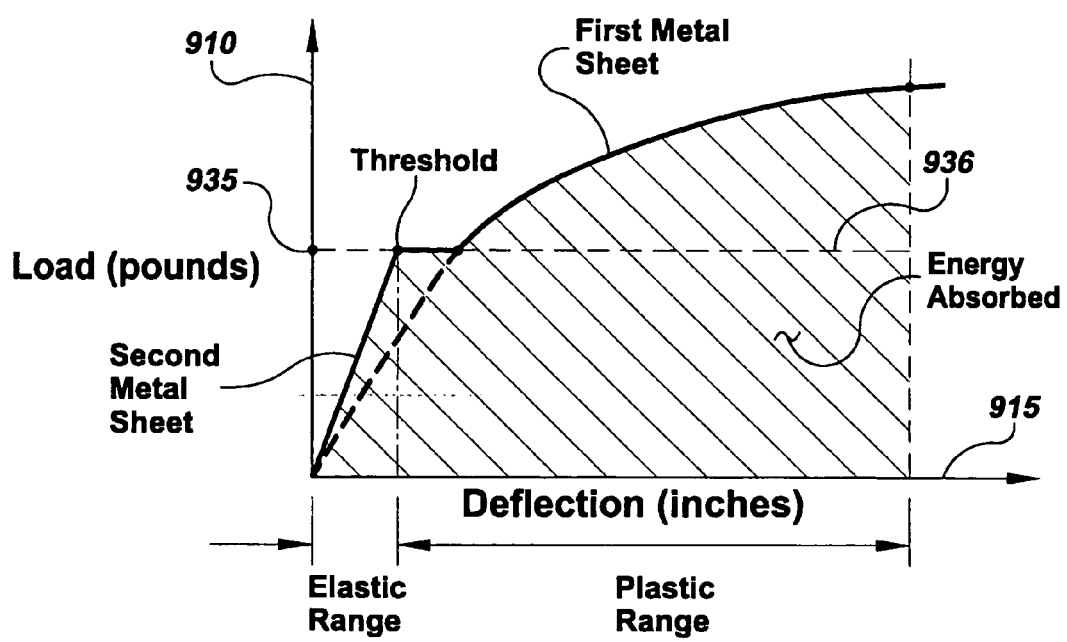
FIG. 9 shows a representative force-deflection graph illustrating the properties of a solid metal sheet and an expanded metal sheet, where the solid metal sheet fails at a predetermined load, thus allowing the expanded metal sheet to absorb impact energy through elasto-plastic deformation, according to an embodiment of the invention.

The second metal sheet 120 may be designed to release suddenly, as illustrated by the load-deflection graph in FIG. 9. Here, load is shown on vertical axis 910 and deflection is shown on horizontal axis 915. For loads of less than the threshold value 935, there is little or no deflection of the second metal sheet 120 since it does not have a significant elastic range. However, when the load exceeds the second threshold value 935, no resistance is offered to the impacting force 118, which may be regarded as an infinite deflection 936.

Referring to FIG. 5, the threshold value 935 for the second metal sheet 120 may be selected through judicious design involving the edge distance L of the center of the pin hole 126 from the edge 124 of the second metal sheet 120, the thickness t of the sheet material, and the physical properties of the sheet material. It should be noted that the shear force required for failure of the second metal sheet 120 increases linearly with respect to increasing pin diameter, number of pins, and thickness t, but that the shear force is not linear with respect to increasing edge distance L. FIG. 6 illustratively shows the shear areas 128 as being portions of the second metal sheet 120 that are removed when the pins 136 shear through the second metal sheet 120; however, it should also be noted that the shearing action may also result in a tearing or bending back of the sheet material so that the shear area 128 may not actually removed but remain connected with the sheet.

The utility of the invention may be seen in the fact that, when the first and second metal sheets 110, 120 are placed in contact with each other, or within a very small distance, the deflection-resistant properties of the second metal sheet 120 prevent the first metal sheet 110 from sagging as the result of numerous small loads that may be less than its threshold value 835. In practice, the second metal sheet 120 may be designed so that its threshold value 935 is greater than or about the same as the value of the first threshold value 835. The first metal sheet 110 and second metal sheet 120 may thus advantageously and cooperatively operate as a unit to provide a stable, energy-absorbing structure that is resistant to gradual deformation over time.

One application of the invention is in the area of aircraft seating. When used in such applications as a seat pan, this structure has been found to meet the requirements for FAA certification to CFR 14, Part 23.562 for general aviation and Part 25.562 for transports, by providing a seat pan configuration that is relatively simple, light weight, and inexpensive. These properties allow the structure to be retrofit into existing seating; it may replace the entire seat pan and still maintain the aircraft within the same physical envelope according to weight and size.

Tests of the inventive energy-absorbing structure as applied to aircraft seating applications have been performed at the Federal Aeronautics Administration (FAA) Civil Aeromedical Research Institute (CAMI) in Oklahoma City, Okla. Such testing included static and dynamic testing in the impact sled test facility. The results have shown that a seat pan incorporating the innovative structural fuse configuration can meet the FAA impact requirements for both general aviation aircraft (CFR 14, Part 23.562) and transport aircraft (CFR 14, Part 25.562).

Tests were conducted using an anthropometric test dummy (ATD), i.e. a version of the hybrid ATD modified specifically for aircraft seat tests, having a test weight of 172 pounds to represent a 50th percentile male. A Denton Model 1891 Lumbar Load Cell was used to measure the force at the base of the ATD lumbar column when the seating arrangement was affixed to a sled that was accelerated along a rail and brought to a sudden stop to generate an impacting force against the seating arrangement. A data acquisition system was used to process the data from sensors in the ATD, along with force, motion, and acceleration data from the sled and seat. Photometric data were also obtained during the deceleration process, using 1000 frames per second video.

Analysis and preliminary tests showed that combining the expanded metal sheet with a rigid metal sheet in the form of the innovative structural fuse was the most attractive solution to the problem of protecting aircraft occupants from vertical forces that might damage the spine. The structural fuse may be configured to fail at a predictable load that is well above normal operational loading conditions. In day-to-day use, the structural fuse may support normal loads without deformation, thereby protecting the expanded metal from permanent set. When the fuse portion fails at the predetermined impact load, the seat pan continues to deform to absorb the impact energy.

Figure 7:
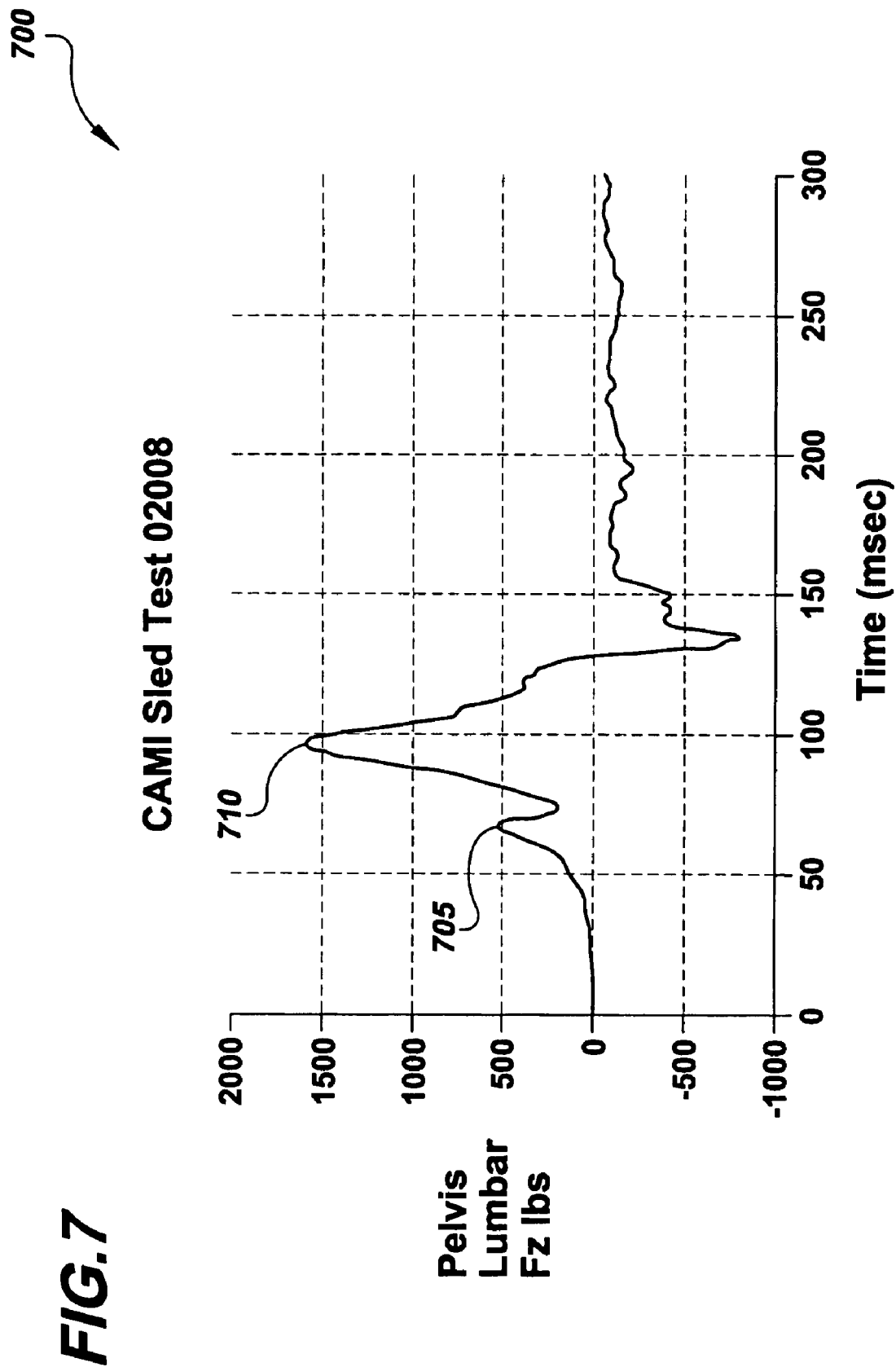
FIG. 7 shows a graph of force exerted against a lumbar measurement device as a function of time for a structural fuse, according to an embodiment of the invention.

According to FIG. 7, the graph 700 shows the load measured by the lumbar load cell of the force at the base of the ATD lumbar column versus time when the innovative structural fuse is used as the seat pan. The load against the energy-absorbing structure is imposed when the sled is decelerated to a sudden stop and is measured during the short duration of time that it takes the sled to decelerate to zero. The lumbar load increases until the failure of the second metal sheet 120, as indicated by the initial peak 705 lumbar load at approximately 0.065 seconds after initial impact, followed by the continuing energy-absorbing deformation of the expanded metal pan of the first metal sheet 110, which reaches a maximum at peak 710. The final lumbar load (when corrected for deceleration error) is 1470 pounds, which is well within acceptable limit for certification in aircraft.

Other modifications to the invention may be made without departing from the scope of the invention. For example, the metal sheets employed in the invention have been described as being arranged such that the expanded metal sheet initially meets the impacting force and is pushed against the second metal sheet between it and the basal surface. However, the order may be reversed as circumstances warrant. That is, the second metal sheet may be oriented so that it initially meets the impacting force and is sheared from its pins, thus forcing it against the first metal sheet of energy-absorbing material; when this embodiment is horizontally oriented as a seating pan, the fuse portion of the structure may be "on top", and the energy-absorbing portion may be "underneath". Other similar modifications may be made without departing from the scope of the invention.

It should be understood, of course, that the foregoing relates to preferred embodiments of the invention and that modifications may be made without departing from the spirit and scope of the invention as set forth in the following claims.

I claim:

1. An energy-absorbing structure arranged to absorb an impacting force, the structure comprising
    a first metal sheet having an incident surface against which the impacting force is applied, the first metal sheet rigidly supported a distance from a basal surface by a rigid support means which allows the first metal sheet to elastically expand in the direction of the basal surface when the magnitude of the impacting force is less than a first threshold value and to return to its original conformation when the impacting force is removed, the rigid support means allowing the first metal sheet to plastically deform when the magnitude of the impacting force is greater than the first threshold value; and
    a second metal sheet positioned between the first metal sheet and the basal surface, the second metal sheet rigidly supported on a first edge, the second metal sheet supported on a second edge by a support means that rigidly supports the second edge when the magnitude of the impacting force is less than a second threshold value and releases the second edge when the magnitude of the impacting force is greater than the second threshold value.

2. The energy-absorbing structure as described in claim 1, wherein first metal sheet is an expanded metal sheet.

3. The energy-absorbing structure described in claim 1, wherein the second metal sheet is disposed against the first metal sheet.

4. The energy-absorbing structure described in claim 1, wherein the second threshold value is greater than the first threshold value, so that the first metal sheet is prevented from elastically expanding until release of the second metal sheet.

5. The energy-absorbing structure as described in claim 1, wherein the support means releases the second edge through a shearing action.

6. The energy-absorbing structure as described in claim 5, further comprising a plurality of pins attached to the support means along the second edge, each pin inserted through a hole in the second metal sheet positioned an edge distance from the second edge, wherein each pin is configured to shear through an area of the second metal sheet between the pin and the second edge when the magnitude of the impacting force exceeds the second threshold value, and each pin rigidly supports the second metal sheet when the impacting force is less than the second threshold value.

7. The energy-absorbing structure described in claim 1, wherein the first and second metal sheets are formed as a seat pan.

8. The energy-absorbing structure described in claim 7, wherein the seat pan is a component of a seat contained in an airborne vehicle.

9. The energy-absorbing structure described in claim 8, wherein the airborne vehicle is chosen from a group consisting of an aircraft, a helicopter, a glider, a space vehicle, and a balloon.

10. An energy-absorbing structure adapted for use in a seat attached a floor of a vehicle to support a torso of a seated person, the torso being subjected to a load, the energy-absorbing structure comprising:
    a first metal sheet supported by a first support means in spaced relation to the floor, wherein energy absorption is maximized for a distance between the first metal sheet and the floor; and
    a second metal sheet having an incident surface arranged to support the torso, the second metal sheet positioned between the torso and the first metal sheet and supported by a plurality of pins attached to a second support means, each pin inserted through a hole positioned a spaced distance from a second metal sheet perimeter, wherein each pin shears through an area of the second metal sheet between the pin and the second metal sheet perimeter when the magnitude of the load exceeds the predetermined threshold value, and each pin rigidly supports the second metal sheet when the magnitude of the load is less than the predetermined threshold value.

11. The energy-absorbing structure described in claim 10, wherein the first support means and the second support means are the same support means.

12. The energy-absorbing structure described in claim 10, wherein at least one of the first support means and the second support means is rigid.

13. The energy-absorbing structure described in claim 10, wherein the first metal sheet is constructed of expanded metal.

14. The energy-absorbing structure described in claim 13, wherein the first metal sheet is configured to plastically deform when the load greater in magnitude than the predetermined threshold value is applied to the incident surface, whereby the pins supporting the second metal sheet shear through their respective areas of the second metal sheet to permit the second metal sheet to become unsupported and therefore allow the incident force to be applied to the first metal sheet.

15. An energy-absorbing seat for use in a vehicle, the seat supporting the torso of a seated person a distance from a solid portion of the vehicle, the seat comprising a frame;

a seat back attached to the frame and supporting the back of the person;

a seat pan attached to the frame, the seat pan supporting the torso of the seated person, the seat pan further comprising a first metal sheet in spaced relation to the solid portion, wherein energy absorption is maximized for a distance between the first metal sheet and the solid portion; and a second metal sheet having an incident surface arranged to support the torso, the second metal sheet positioned between the torso and the first metal sheet and supported by a plurality of pins attached to the frame, each pin inserted through a hole positioned a spaced distance from a second metal sheet perimeter, wherein each pin shears through an area of the second metal sheet between the pin and the second metal sheet perimeter when the magnitude of the force exceeds the predetermined threshold value and each pin rigidly supports the second metal sheet when the force is less than the predetermined threshold value.

16. The energy-absorbing structure described in claim 15, wherein the first metal sheet is constructed of expanded metal.

17. The energy-absorbing structure described in claim 15, wherein the vehicle is selected from a group consisting of an aircraft, a helicopter, a glider, a space vehicle, a submarine, a truck, a car, and a balloon.

18. An airborne vehicle with energy-absorbing seats, at least one of the energy-absorbing seats comprising a rigid frame attached to a basal surface of the airborne vehicle;

a seat back attached to the frame, the seat back supporting the back of a person occupying the seat;

a seat pan held in spaced relation to the basal surface, the seat pan supporting the torso of the person, the seat pan comprising an expanded metal sheet held in spaced relation to the basal surface by the frame, wherein energy absorption is maximized for a distance between the expanded metal sheet and the basal surface; and a solid metal sheet having an incident surface located against the torso, the solid metal sheet positioned between the torso and the expanded metal sheet, the solid metal sheet supported by a plurality of pins attached to the frame, each pin inserted through a hole with an area between the hole and a perimeter of the solid metal sheet, wherein each pin shears through its respective area when the magnitude of a force exerted on the incident surface exceeds a predetermined threshold value and each pin rigidly supports the solid metal sheet when the force is less than the predetermined threshold value.

19. The airborne vehicle described in claim 18, wherein the force exerted by the torso on the incident surface results from a vertical component of airborne vehicle movement.

20. The airborne vehicle described in claim 18, wherein the expanded metal sheet plastically deforms when the pins shear through their respective areas and allow the force to be applied to the expanded metal sheet.

21. A method of absorbing energy, the method comprising the steps of providing an expanded metal sheet that is rigidly supported so as to permit the expanded metal sheet to elastically deform when the magnitude of a force exerted upon its incident surface is less than a first threshold value;

supporting a solid metal sheet by a plurality of pins inserted through holes in the solid metal sheet that shear through the solid metal sheet when the magnitude of the force exceeds a second threshold value;

positioning the solid metal sheet to prevent the force from elastically deforming the expanded metal sheet when the force is less than the predetermined threshold value; and allowing the expanded metal sheet to plastically deform to absorb the force when the magnitude of the force exceeds the first threshold value and causes the pins to shear through the solid metal sheet, wherein the solid metal sheet no longer supports the expanded metal sheet and allows it to plastically deform.

* * * * *